Figure 1:
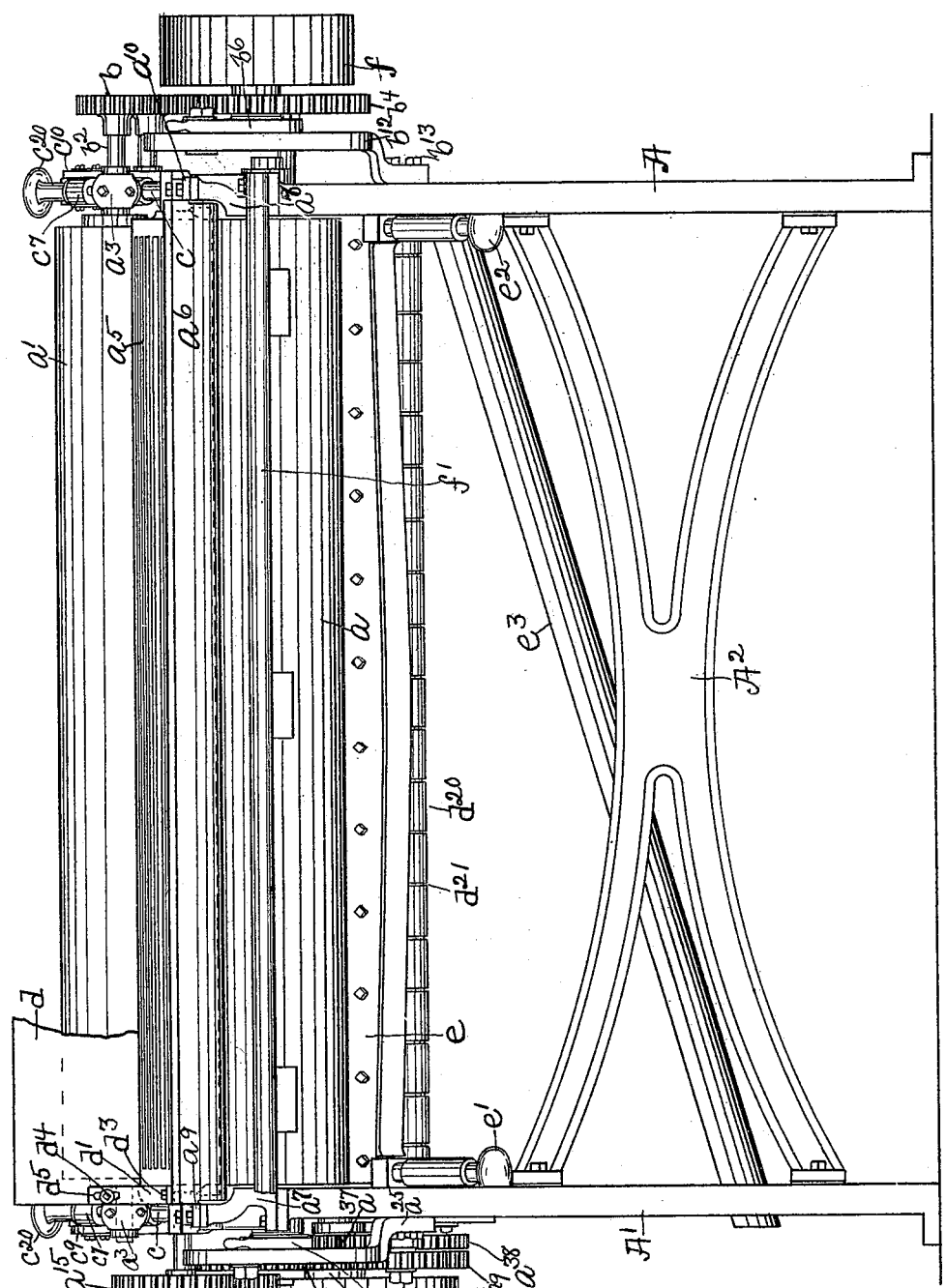

No. 621,457. Patented Mar. 21, 1899.
A. F. JONES.
LEATHER COLORING MACHINE.
(Application filed June 4, 1897.)
(No Model.) 7 Sheets—Sheet 2.

WITNESSES. INVENTOR.

No. 621,457. Patented Mar. 21, 1899.
A. F. JONES.
LEATHER COLORING MACHINE.
(Application filed June 4, 1897.)
(No Model.) 7 Sheets—Sheet 3.

WITNESSES.
Matthew M. Blunt
J. Murphy

INVENTOR.
Albert F. Jones
By Jas. H. Churchill
ATT'Y.

No. 621,457. Patented Mar. 21, 1899.
A. F. JONES.
LEATHER COLORING MACHINE.
(Application filed June 4, 1897.)
(No Model.) 7 Sheets—Sheet 4.

WITNESSES.
Matthew M Blunt
J. Murphy.

INVENTOR
Albert F. Jones
by Jas. H. Churchill
ATTY

No. 621,457. Patented Mar. 21, 1899.
A. F. JONES.
LEATHER COLORING MACHINE.
(Application filed June 4, 1897.)
(No Model.) 7 Sheets—Sheet 5.

WITNESSES.
Matthew M. Blunt.
J. Murphy.

INVENTOR.
Albert F. Jones
by Jas. H. Churchill
ATT'Y.

No. 621,457. Patented Mar. 21, 1899.
A. F. JONES.
LEATHER COLORING MACHINE.
(Application filed June 4, 1897.)
(No Model.) 7 Sheets—Sheet 7.

WITNESSES.
Matthew M. Blunt.
J. Murphy.

INVENTOR.
Albert F. Jones
by Jas. H. Churchill
ATT'Y.

THE NORRIS PETERS CO., PHOTO-LITHO., WASHINGTON, D. C.

UNITED STATES PATENT OFFICE.

ALBERT F. JONES, OF SALEM, MASSACHUSETTS, ASSIGNOR TO THE VAUGHN MACHINE COMPANY, OF PORTLAND, MAINE.

LEATHER-COLORING MACHINE.

SPECIFICATION forming part of Letters Patent No. 621,457, dated March 21, 1899.

Application filed June 4, 1897. Serial No. 639,398. (No model.)

*To all whom it may concern:*

Be it known that I, ALBERT F. JONES, residing in Salem, in the county of Essex and State of Massachusetts, have invented an Improvement in Leather-Dressing Machines, of which the following description, in connection with the accompanying drawings, is a specification, like letters and figures on the drawings representing like parts.

This invention relates to a machine or apparatus for applying a liquefied substance, such as coloring-matter or dressing, to leather, hides, skins, or like material, and has for its object to provide an efficient machine for this purpose with which superior results may be obtained at a minimum cost.

In accordance with this invention the color or other liquefied substance is contained in a pan, trough, or receptacle closed at its bottom and open at its top and in which rotates a feed-roll which carries the color up out of the pan onto a rotating brush supported in preferably adjustable bearings and which brush applies the color to the leather, hide, or skin. The machine is also provided with a brush which works the color evenly into the leather, hide, or skin and which rotates in preferably adjustable bearings.

The machine is further provided with mechanism, as will be described, which permits the speed of the feed-roll and of the brushes to be changed as desired, according to the density of the liquid and the finish desired on the leather.

The machine may and preferably will also be provided with a spatter-board, which is adjustable toward and from the feed-roll to regulate the quantity of coloring-matter applied to the leather.

These and other features of this invention will be pointed out in the claims at the end of this specification.

Figure 2:
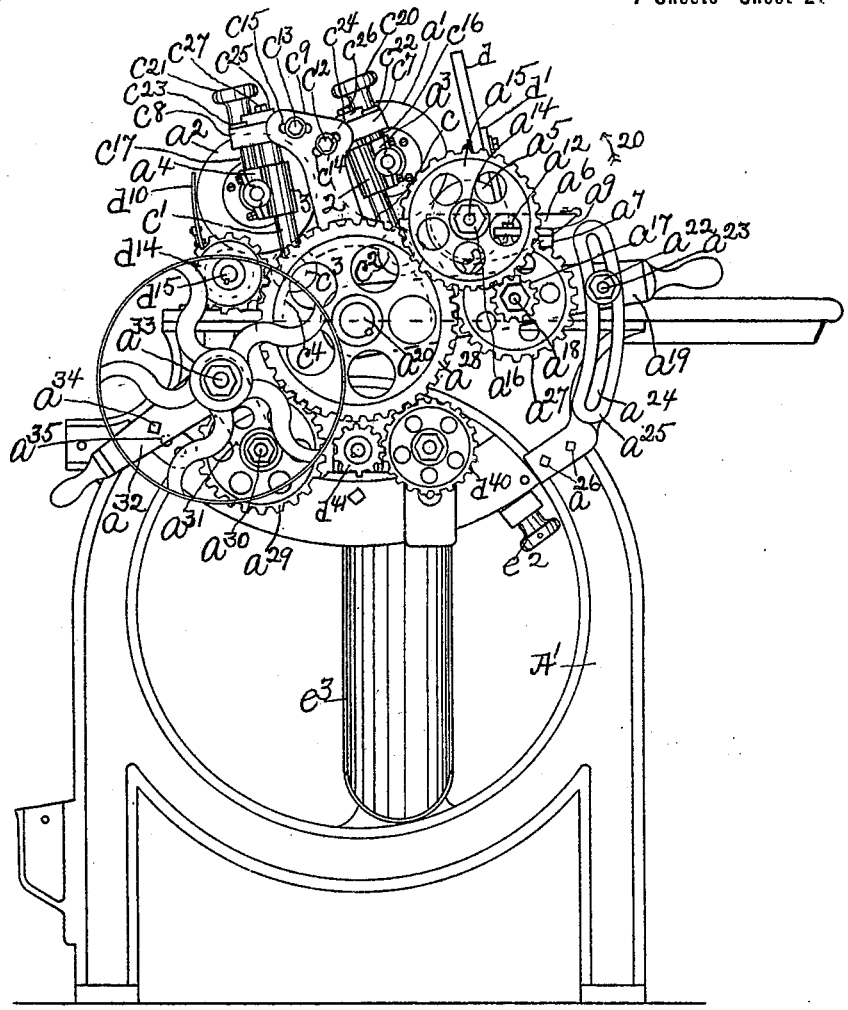
Figure 3:
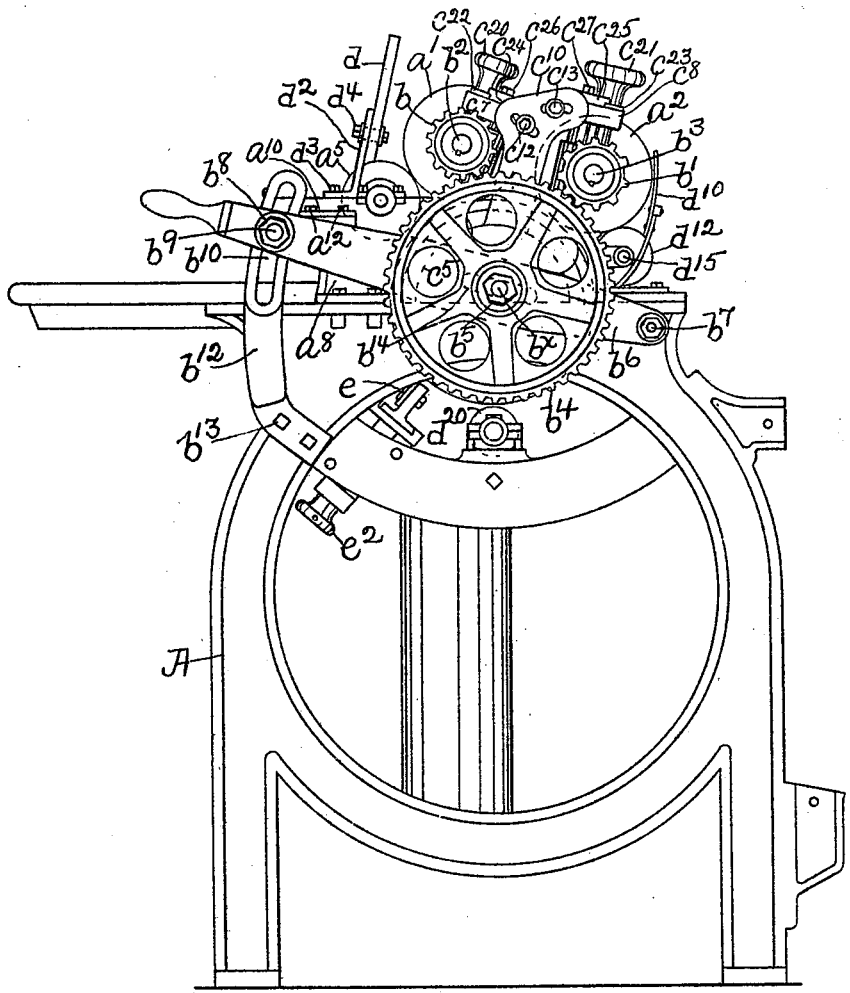
Figure 4:
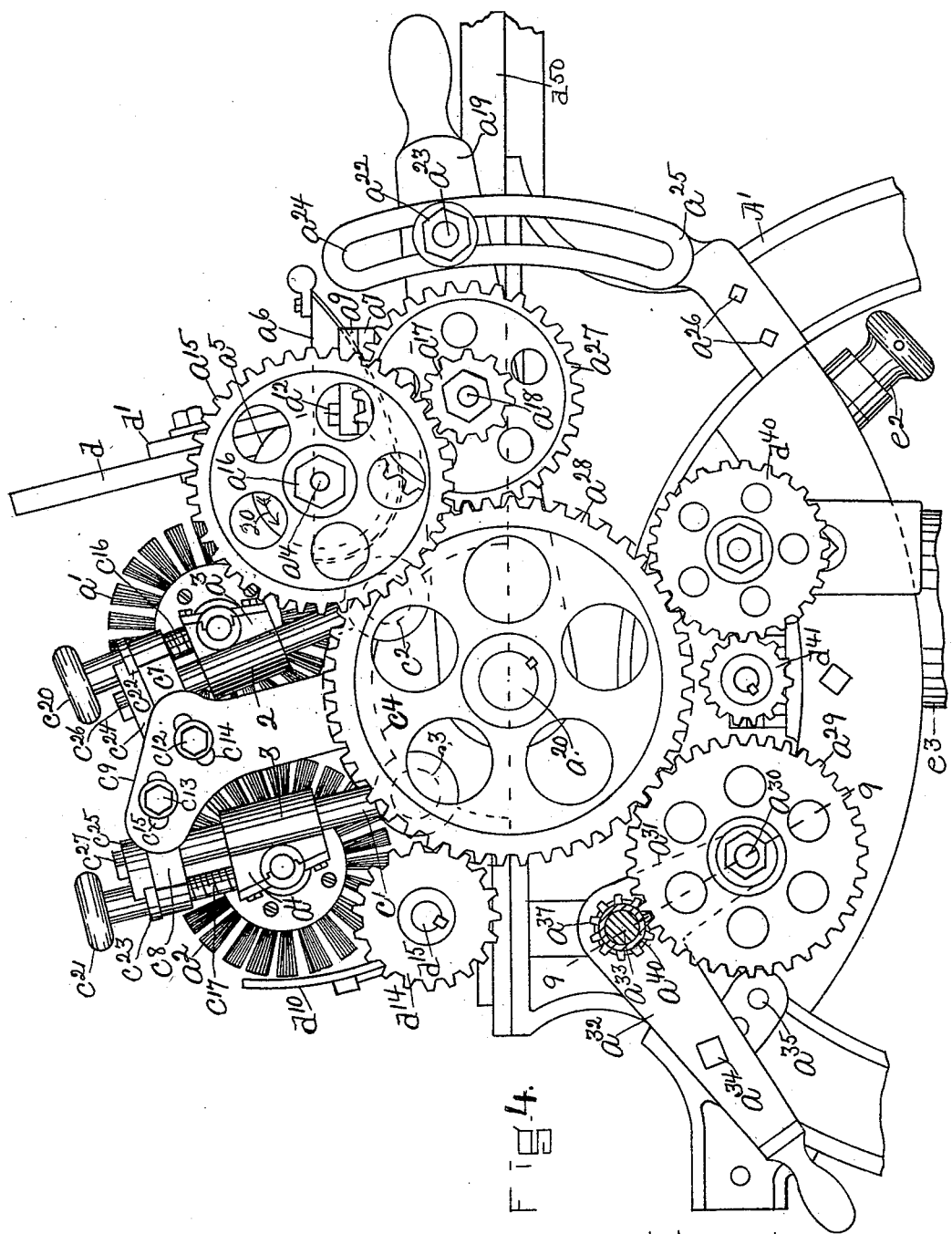
Figure 5:
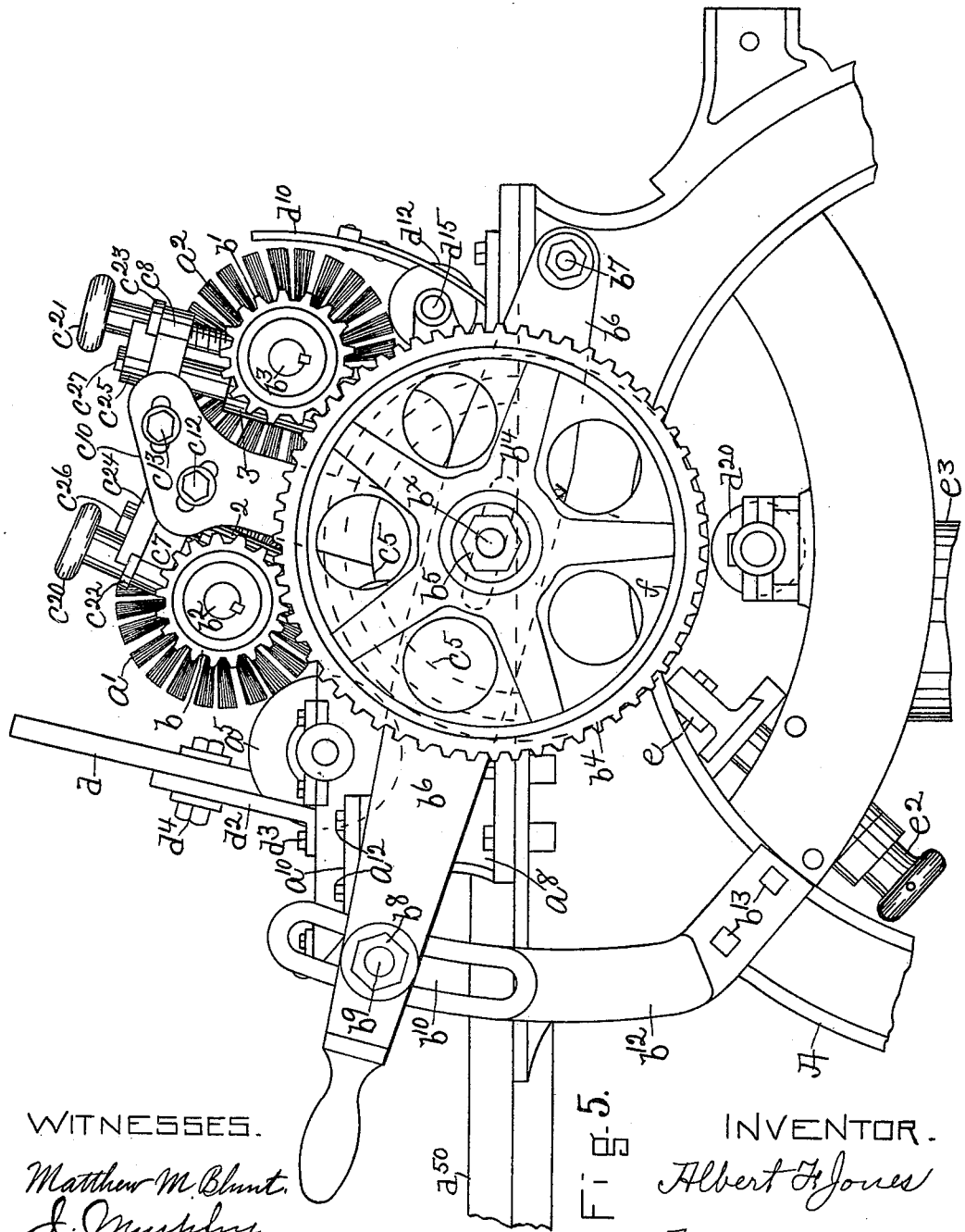
Figure 6:
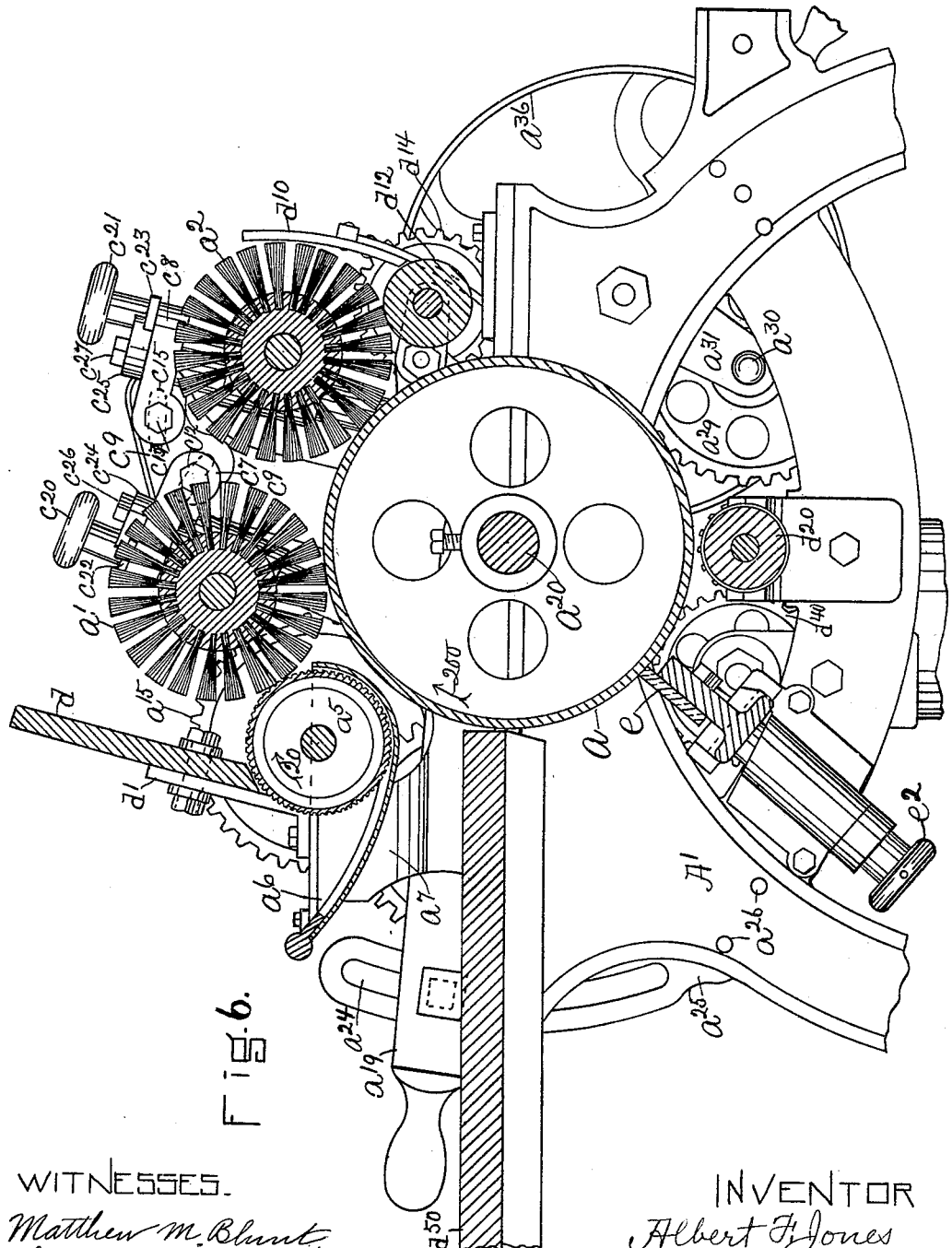
Figure 7:
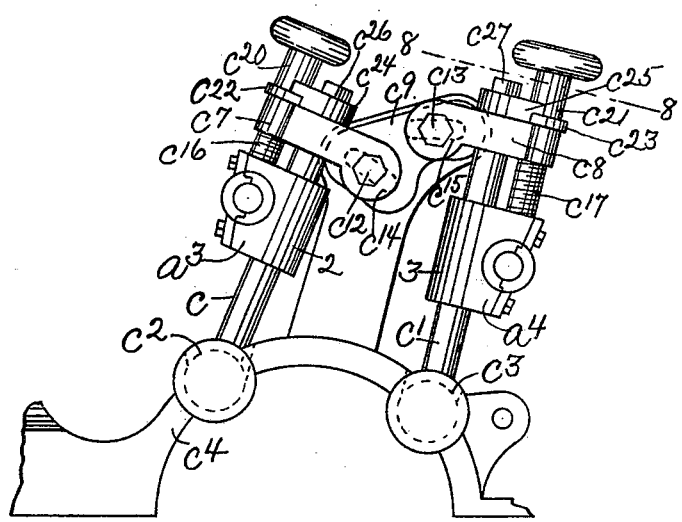
Figure 8:
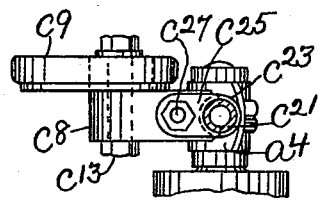
Figure 9:
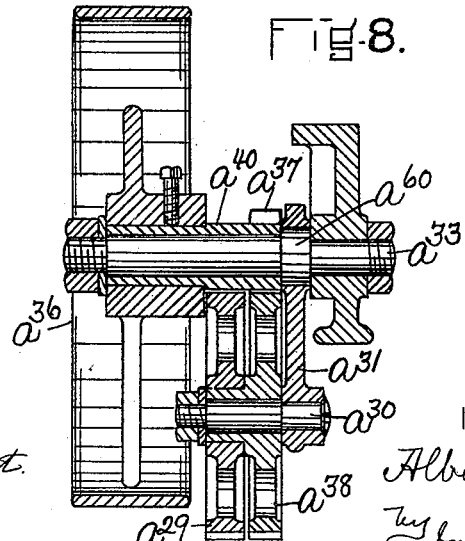

Figure 1 is a front elevation of a machine embodying this invention; Fig. 2, a side elevation of the machine shown in Fig. 1, looking toward the right; Fig. 3, a side elevation of the machine looking toward the left in Fig. 1; Fig. 4, a detail in side elevation and on an enlarged scale of the upper part of the side of the machine shown in Fig. 2; Fig. 5, a like detail of the upper part of the side of the machine shown in Fig. 3; Fig. 6, a transverse sectional view of the machine shown in Fig. 1; Figs. 7, 8, and 9, details to be referred to, made on an enlarged scale, Fig. 8 being a sectional view on the line 8 8, Fig. 7, and Fig. 9 a sectional view on the line 9 9, Fig. 4.

The operative parts of the machine herein shown are supported by a suitable framework, comprising side uprights or standards A A', joined by cross-bars $A^2$. The upright side pieces A A' support in suitable bearings a cylinder or drum $a$, (see Fig. 6,) forming a rotating bed upon which the leather or skin to be treated is laid and carried from the front to the rear side of the machine. The leather or skin to be treated is carried under revolving brushes $a'$ $a^2$, (see Fig. 6,) which may be of any suitable construction and which are represented in Figs. 1, 2, and 3 as plain cylinders or rolls and which are respectively mounted in preferably adjustable bearings $a^3$ $a^4$ of a construction as will be described.

The brush $a'$ coöperates with a color feed roll or cylinder $a^5$, which may be of any suitable or usual construction and which is shown in Fig. 1 as fluted longitudinally and which in accordance with this invention revolves in a shallow trough or pan $a^6$, closed at its bottom, so as to hold the color or other liquid substance, and open at its top to receive the lower part or half of the said feed-roll and located below the center of the brush or roll $a'$, so as to carry the color up out of the pan or trough onto the said brush. The color pan or trough $a^6$ is supported at its opposite ends upon suitable uprights $a^7$ $a^8$, (see Figs. 5 and 6,) fastened to the side frames A A', the said pan being shown as provided with projections or ears $a^9$ $a^{10}$, which are secured to the uprights $a^7$ $a^8$ by bolts or screws $a^{12}$. The color feed-roll $a^5$ has its shaft $a^{14}$ supported in journal-boxes attached to the sides of the color trough or pan $a^6$, and on one side of the machine the shaft $a^{14}$ has mounted on it a gear $a^{15}$, which is preferably detachably held onto its shaft by the nut $a^{16}$. The gear $a^{15}$ meshes with a pinion $a^{17}$, mounted on a stud or projection $a^{18}$, extended from a lever or arm $a^{19}$, loosely mounted at its inner end on the shaft $a^{20}$ of the revolving cylinder or support $a$ for the leather or skin. The lever or arm $a^{19}$ is adapted to be moved on the shaft $a^{20}$ as a center, so as to vary the position of the pinion $a^{17}$ with relation to the gear $a^{15}$ on the feed-roll shaft $a^{14}$ to enable gears $a^{15}$ of different sizes to be used, and thereby enable the color feed-roll $a^5$ to be rotated at various speeds, according to the density of the liquor or fluid in the pan or trough $a^6$.

The lever or arm $a^{19}$ constitutes a movable support for the pinion $a^{17}$, and may be secured in its adjusted position, as herein shown, by a nut $a^{22}$ on a threaded stud $a^{23}$, extended from the lever $a^{19}$ through a curved slot $a^{24}$ in a bracket or arm $a^{25}$, attached to the side frame A', as by bolts $a^{26}$. (See Fig. 2.)

The stud or shaft $a^{18}$ also has mounted on it a gear $a^{27}$, which meshes with a gear $a^{28}$ on the shaft $a^{20}$, and the gear $a^{28}$ meshes with and is driven by a gear $a^{29}$, fast on the hub of a gear $a^{38}$, which is fast on a shaft $a^{30}$, having bearings in an arm $a^{31}$ (see Figs. 4 and 9) of a bell-crank lever $a^{32}$, loosely mounted on a collar $a^{60}$ (see Fig. 9) on a shaft or stud $a^{33}$, projecting from the side frame A'. The lever $a^{32}$ is secured in its adjusted position, as shown, by a bolt or pin $a^{34}$, extended into one of a series of holes $a^{35}$ in the framework of the machine.

The shaft $a^{33}$ has loose on it a sleeve $a^{40}$, which has fast on it a driving-pulley $a^{36}$ and a pinion $a^{37}$, (see Figs. 1, 4, and 9,) in mesh with the gear $a^{38}$ on the shaft $a^{30}$. This construction permits the gear $a^{28}$ to be replaced by a smaller or larger gear, so that the speed of the drum or cylinder $a$ may be changed as desired.

The brushes $a'$ $a^2$ are rotated, as herein shown, by means of pinions $b$ $b'$, (see Figs. 3 and 5,) fast on the shafts $b^2$ $b^3$ of the said brushes and in mesh with a gear $b^4$, detachably secured, as by a nut $b^5$, on a stud or shaft $b^×$, adjustably secured to a movable support (shown as an arm or lever $b^6$) pivoted, as at $b^7$, to the upright A, the said lever being secured in its adjusted position, as herein shown, by a nut $b^8$ on a bolt $b^9$, extended through the said lever and through a slot $b^{10}$ in a bracket or arm $b^{12}$, attached, as by bolts $b^{13}$, to the side frame A. The stud or shaft $b^×$ is adjustable in a longitudinal slot $b^{14}$ (see dotted lines, Fig. 3) in the lever $b^6$. The gear $b^4$ may be removed and a similar gear of larger or smaller diameter may be substituted therefor to cause the brushes to rotate at different speeds, according to the work to be performed. The gear $b^4$ may be driven by a pulley $f$, fastened to its hub in any suitable manner.

The brushes $a'$ $a^2$ are preferably adjustable with relation to the cylinder or drum $a$ and feed-roll $a^5$, and to effect this adjustment the bearings $a^3$ $a^4$ for the shafts $b^2$ $b^3$ of the brushes are adjustable. The bearings $a^3$ $a^4$ are preferably made as herein shown and are provided with sleeves 2 3 (see Figs. 4, 5, and 7) to fit over and slide upon upright rods $c$ $c'$, pivoted, as at $c^2$ $c^3$, to arch-shaped castings or supporting-pieces $c^4$ $c^5$, suitably bolted to the side frames A A'.

The rods $c$ $c'$ are provided at their upper ends with arms $c^7$ $c^8$, adjustably secured to upright arms $c^9$ $c^{10}$, as by bolts $c^{12}$ $c^{13}$, extended through slots $c^{14}$ $c^{15}$ in said uprights, which latter may be integral with the arch-shaped castings $c^4$ $c^5$. The arms $c^7$ $c^8$ have extended up through them rods $c^{16}$ $c^{17}$, attached at their lower end to the bearings $a^3$ $a^4$ and provided at their upper ends with screw-threads which are engaged by internally-threaded thumb-pieces or nuts $c^{20}$ $c^{21}$, provided at their lower ends with annular flanges $c^{22}$ $c^{23}$, which bear against the upper surface of the arms $c^7$ $c^8$ and which are engaged by clamping or locking pieces $c^{24}$ $c^{25}$, secured by screws $c^{26}$ $c^{27}$ to the arms $c^7$ $c^8$, the said clamps serving to secure the nuts or thumb-pieces $c^{20}$ $c^{21}$ from turning when the brushes have been adjusted until it is desired to readjust the said brushes. The feed-roll $a^5$ has coöperating with it a spatter-board $d$, which in accordance with this invention is adjustably secured to supports (shown as angle-irons $d'$ $d^2$) fastened to the sides of the color pan or trough $a^6$, as by bolts $d^3$. (See Figs. 1, 5, and 6.) The spatter-board $d$ is adjustably secured to the upright members of the angle-irons, as herein shown, by means of bolts $d^4$, extended through slots $d^5$ in said members.

The adjustability of the spatter-board imparts to it the function of a regulator for the amount of color fed to the brush $a'$, which is especially advantageous when a thick coloring liquor or substance is used. When a thick liquor is used, the feed-roll $a^5$ is apt to take up a surplus of the coloring or other liquid or substance which is scraped off by the spatter-board as the feed-roll rotates under the said board in the direction indicated by the arrow 20, Figs. 2, 4, and 6, and the said board can be adjusted so as not to remove too much of the coloring substance. The machine may and preferably will be provided on its rear side with a spatter-board $d^{10}$, coöperating with the brush $a^2$, and the latter may also have coöperating with it a spatter-roll $d^{12}$, suitably supported in the framework of the machine and rotated by a pinion $d^{14}$ on its shaft $d^{15}$, the said pinion meshing with the gear $a^{28}$.

In the present instance the machine is represented as provided with a roll $d^{20}$, (see Fig. 1,) having annular grooves $d^{21}$ for the reception of endless strings or bands, not herein shown, but which form a movable apron or table upon which the treated skin is discharged. The roll $d^{20}$ may be rotated from the gear $a^{28}$ by means of a small gear $d^{40}$ and a pinion $d^{41}$, which latter is on the shaft of said roll, as shown in Figs. 2 and 4.

The cylinder $a$, which constitutes the revolving bed of the machine, has coöperating with it a knife or scraper $e$, (see Figs. 1, 3, and 6,) adjustable toward the said cylinder by set-screws $e'$ $e^2$, and the machine may also be provided with an inclined chute $e^3$ to receive the coloring-matter or other substance scraped off from the bed or cylinder $a$ by the knife $e$.

From the above description it will be seen that the brushes $a'\ a^2$ are capable of adjustment in two different directions—that is, they are capable of being adjusted by movement of their bearing-boxes on the rods $c\ c'$, while the latter remain stationary, or they may be adjusted by movement of the rods $c\ c'$ on their pivots, while the bearing-boxes for the brushes are stationary on said rods, or the said brushes may be adjusted by movement of both the bearing-boxes and the rods $c\ c'$. So, also, it will be seen that the speed of rotation of the brush-rolls $a'\ a^2$ may be regulated to suit the particular work required by removing the gear $b^4$, replacing it with a larger or smaller gear, and adjusting the lever $b^6$ so that the new gear $b^4$ will mesh with the pinions $b\ b'$. In a similar manner the speed of rotation of the feed-roll $a^5$ may be changed by removing the gear $a^{15}$, replacing it with one of different diameter, and moving the lever $a^{19}$ so as to enable the pinion $a^{17}$ to mesh with the new gear $a^{15}$. In the machine herein described it will also be noticed that the color pan or trough $a^6$ is open only at its top and that the color is retained therein when the machine is at rest and no opportunity is afforded the same to run or leak out of the pan onto the other parts of the apparatus, thereby avoiding waste of coloring or other liquid and gumming up and consequent cleaning of the machine.

The brushes are capable of being adjusted while the machine is in operation. The construction herein shown also permits the machine to be run with a minimum amount of power.

The framework of the machine has secured to it a table $d^{50}$, upon which the skin is placed and fed to the revolving drum $a$, which carries it (in the direction indicated by arrow 200, Fig. 6) to the opposite side of the machine, where it may drop upon the apron formed by the endless cords above referred to or where it may be taken off from the drum by the operator. The table $d^{50}$ is attached to the framework so that its upper surface is above the center of the drum $a$, so that the skin will be carried up on the said drum, as the latter revolves, in the direction indicated by the arrow 200, Fig. 6.

I claim—

1. In a machine of the character described, the combination of the following instrumentalities, viz: a rotating drum or cylinder over which the leather is passed and supported thereon, a rotating brush supported above the said cylinder to apply the color to the leather supported on said cylinder, a pan or trough to hold the color closed at its bottom and open at its top and supported below and at one side of the center of said brush but above the center of the drum or cylinder, and a color feed-roll rotating in the open color-pan to carry the color up out of the pan and onto the said brush, substantially as described.

2. In a machine of the character described, the combination of the following instrumentalities, viz: a rotating supporting-surface for the leather, a brush or roll to apply the color to the leather on said supporting-surface, a pan or trough to hold the color closed at its bottom and open at its top and supported below and at one side of the center of said brush or roll, and a feed-roll rotating in the open color-pan to carry the color up out of the pan and onto the said brush, and a spatter-board coöperating with the said feed-roll, substantially as described.

3. In a machine of the character described, the combination of the following instrumentalities, viz: a rotating supporting-surface for the leather, a rotating color-applying roll or brush supported in boxes adjustable in one direction, adjustable supports for said boxes movable in a different direction, means to lock said boxes in their adjusted positions on said supports, means to lock said supports in their adjusted positions, and means to supply the said brush with color, substantially as described.

4. In a machine of the character described, the combination of the following instrumentalities, viz: a rotating supporting-surface for the leather, a brush or roll to apply the color to the leather on said supporting-surface, a pan or trough to hold the color, closed at its bottom and open at its top and supported below and at one side of the said roll or brush, and a feed-roll rotating in the open color-pan to carry the color up out of the pan and onto the said brush, and a substantially vertical spatter-board coöperating with the said feed-roll and adjustable toward and from the same, substantially as and for the purpose specified.

5. In a machine of the character described, the combination of the following instrumentalities, viz: a rotating cylinder or surface to support the leather, a brush or roll $a'$ to apply the color to the leather, a brush or roll $a^2$ to distribute the color evenly over the surface of the leather, bearings for said brushes or rolls capable of independent adjustments in different directions, a color-containing trough or pan closed at its bottom and open at its top and located below the brush or roll $a'$, a feed-roll rotating in said pan or trough to carry the color up out of the same onto one of said brushes or rolls, and means to rotate said brushes and feed-rolls, substantially as described.

6. In a machine of the character described, the combination of the following instrumentalities, viz: a rotating cylinder or surface to support the leather, a color-applying brush or roll coöperating therewith, a color-containing pan or trough closed at its bottom and open at its top and located below the brush or roll, a feed-roll rotating in said pan to carry the color up out of the pan onto the said brush or roll, gearing to rotate said brush, and gearing to rotate said feed-roll, and adjustable supports for the said gearing to permit the speed of rotation of the said brushes and feed-roll to be changed, substantially as described.

7. In a machine of the character described, the combination of the following instrumentalities, viz: a rotating cylinder to support the leather, a roller or brush provided with bearing-boxes, upright supports on which said boxes are adapted to be moved longitudinally to adjust the said roll with relation to the said cylinder, and means to lock said boxes in their adjusted position on said supports, substantially as described.

8. In a machine of the character described, the combination of the following instrumentalities, viz: a rotating cylinder to support the leather, a roll or brush provided with bearing-boxes, movable upright supports on which said boxes are adapted to be moved longitudinally, means to lock said boxes in their adjusted position on said supports, and means to lock said supports in their adjusted position, substantially as described.

9. In a machine of the character described, the combination of the following instrumentalities, viz: a framework, a rotary drum $a$ mounted to revolve therein, rotating brushes $a'$, $a^2$ journaled in boxes longitudinally adjustable on upright pivoted supports, means to lock said boxes in their adjusted position, means to lock said upright supports in their adjusted position, a color pan or trough open at its top and closed at its bottom, and a feed-roll rotating in said open pan or trough to carry the color up onto the brush $a'$, substantially as described.

10. In a machine of the character described, the combination of the following instrumentalities, viz: a framework, a rotating drum $a$ journaled in said framework, a table secured to said framework with its upper surface above the center of said drum, rotating brushes $a'$ $a^2$ above said drum, means to rotate said brushes in the same direction, journal-boxes for said brushes, pivotal rods on which said journal-boxes are longitudinally adjustable, means to secure said pivotal rods in their adjusted position, a color-containing pan or trough open at its top and closed at its bottom and located above said table and below and to one side of one of said brushes, and a rotary color feed-roll in said pan to carry the color up onto the brush adjacent to it, substantially as described.

In testimony whereof I have signed my name to this specification in the presence of two subscribing witnesses.

ALBERT F. JONES.

Witnesses:
   JAS. H. CHURCHILL,
   J. MURPHY.